United States Patent
Issa

(10) Patent No.: US 8,024,784 B1
(45) Date of Patent: Sep. 20, 2011

(54) METHOD AND SYSTEM FOR PROVIDING REMOTE SECURE ACCESS TO A PEER COMPUTER

(75) Inventor: Alfredo C Issa, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 1138 days.

(21) Appl. No.: 10/942,578

(22) Filed: Sep. 16, 2004

(51) Int. Cl.
*G06F 15/16* (2006.01)

(52) U.S. Cl. ........... 726/9; 726/2; 726/4; 726/5; 726/12; 713/153; 713/156; 713/168; 713/175; 713/185; 709/217; 709/219; 709/227; 709/229

(58) Field of Classification Search ................... 713/1, 2, 713/188, 194, 153, 156, 168, 175, 185; 380/200, 380/201, 255, 277; 726/2, 9, 4, 5, 12; 173/1, 173/2, 188, 194, 153, 156, 168, 170, 175, 173/185; 709/217, 219, 227, 229
See application file for complete search history.

(56) References Cited

U.S. PATENT DOCUMENTS

| | | | | |
|---|---|---|---|---|
| 5,619,657 A * | 4/1997 | Sudama et al. | ............... | 709/225 |
| 6,161,182 A * | 12/2000 | Nadooshan | ................... | 713/172 |
| 6,301,661 B1 * | 10/2001 | Shambroom | ................ | 713/168 |
| 6,324,648 B1 * | 11/2001 | Grantges, Jr. | ................... | 726/12 |
| 6,862,571 B2 * | 3/2005 | Martin et al. | ..................... | 705/4 |
| 6,986,047 B2 * | 1/2006 | Giles et al. | ..................... | 713/175 |
| 7,228,438 B2 * | 6/2007 | Bushmitch et al. | .......... | 713/193 |
| 7,302,591 B2 * | 11/2007 | Oliver et al. | .................. | 713/193 |
| 7,366,900 B2 * | 4/2008 | Shambroom | ................ | 713/168 |
| 2002/0054080 A1 * | 5/2002 | Belanger et al. | ............. | 345/738 |
| 2002/0133412 A1 * | 9/2002 | Oliver et al. | ..................... | 705/26 |
| 2002/0178271 A1 * | 11/2002 | Graham et al. | .............. | 709/229 |
| 2003/0105954 A1 * | 6/2003 | Immonen et al. | ............ | 713/156 |
| 2004/0268152 A1 * | 12/2004 | Xia et al. | ...................... | 713/201 |
| 2005/0005133 A1 * | 1/2005 | Xia et al. | ...................... | 713/185 |
| 2005/0132060 A1 * | 6/2005 | Mo et al. | ...................... | 709/227 |
| 2005/0154886 A1 * | 7/2005 | Birk et al. | ..................... | 713/168 |
| 2008/0016232 A1 * | 1/2008 | Yared et al. | ................... | 709/229 |
| 2009/0132824 A1 * | 5/2009 | Terada et al. | ................. | 713/175 |

* cited by examiner

*Primary Examiner* — Zachary A Davis
*Assistant Examiner* — Joseph Pan
(74) *Attorney, Agent, or Firm* — Withrow & Terranova, PLLC

(57) ABSTRACT

A method and system for allowing a user to access a peer from a remote system are described. The method and system include authenticating the user for the peer using an authentication server and providing a token for the peer and the user based on the authenticating. The user is authenticated from the remote system. The method and system also include allowing the user to access the peer from the remote system through a proxy server and using the token, if the user is authenticated.

15 Claims, 3 Drawing Sheets

Figure 1

METHOD AND SYSTEM FOR PROVIDING REMOTE SECURE ACCESS TO A PEER COMPUTER

CROSS-REFERENCE TO RELATED APPLICATIONS

The present application is related to U.S. patent application Ser. No. 10/813,839 entitled "Method and System for Providing Web Browsing Through a Firewall in a Peer to Peer Network" filed on Mar. 31, 2004, and assigned to the assignee of the present application.

FIELD OF THE INVENTION

The present invention relates to peer-to-peer computer systems and more particularly to a method and system for providing remote secure access to a peer computer.

BACKGROUND OF THE INVENTION

One mechanism for sharing information, such as images, between users is a peer-to-peer (P2P) network. In conventional P2P networks, each conventional computer system, or peer, in the network can act as a server for other peers in the network. For example, photosharing applications allow each peer in the P2P network to act as a server to share pictures with others in the network without the users having to upload their pictures to a Web site. One example of such a P2P application is Photo Vibe 1.2 by XFonnx, Inc. of Needham, Mass.

In order to facilitate sharing of information, a conventional peer is separated into two portions: a public portion and a protected portion. The public portion includes materials that guests can view copy or otherwise manipulate. Thus, a user of a first peer can be a guest on a second peer. As a guest, the user can view, copy, or similarly manipulate material accessible to the guest on the second peer. For example, photos which a user of the peer wishes to share with others are accessible through the public portion of the peer. The protected portion is accessible only by authorized users, not to guests. For example, a username and/or password may be required to authenticate a user and allow the user access to the protected portion. The authorized user is typically the owner or user of the peer. Using the protected portion, the authorized user of the peer can perform operations that are unavailable to guests. For example, using the protected portion, the authorized user can alter images, including images that are publicly accessible or otherwise configure the guest portion of the peer, as well as altering the images that are available to guests.

Although the conventional P2P function, one of ordinary skill in the art will readily recognize that it is desirable for an authorized user to securely access the peer. Stated differently, it would be desirable for users, particularly peer owners, to be able to access protected portions of the peer from a remote computer system, for example through the Internet. One conventional method for doing so utilizes secure certificates. In such a conventional method, the authorized user would obtain a secure certificate from a trusted certificate authority. Using the secure certificate, the authorized user can remotely access the peer, including protected portions of the peer. However, one of ordinary skill in the art will readily recognize that secure certificates are expensive. Typically, each certificate costs at least one hundred dollars. Such a high cost is undesirable. Furthermore, if each peer owner in the P2P network is given secure remote access to their peer, secure certificates for each peer may need to be managed. Managing such a large number of certificates may also require a significant overhead, which is also undesirable.

Another conventional method for allowing for remote, secure access to peers includes using Kerberos based systems. A Kerberos system is designed to allow a user to be authenticated once, then have access to multiple systems having different types. However, one of ordinary skill in the art will readily recognize that Kerberos systems are notoriously complicated. Furthermore, Kerberos systems are designed to address a different issue. Consequently, Kerberos systems are not tailored to allow many individual users to each be able to securely and remotely access particular peer(s).

Accordingly, what is needed is an improved method for remotely and securely accessing a peer. The present invention addresses such a need.

BRIEF SUMMARY OF THE INVENTION

The present invention provides a method and system for allowing a user to access a peer from a remote system. The method and system comprise authenticating the user for the peer using an authentication server and providing a token for the peer and the user based on the authenticating. The user is authenticated from the remote system. The method and system also comprise allowing the user to access the peer from the remote system through a proxy server and using the token, if the user is authenticated.

According to the method and system disclosed herein, the present invention allows individual users to remotely access protected portions of a corresponding peer in a secure manner.

DETAILED DESCRIPTION OF THE INVENTION

The present invention relates to P2P networks. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The present invention provides a method and system for allowing a user to access a peer from a remote system. The method and system comprise authenticating the user for the peer using an authentication server and providing a token for the peer and the user based on the authenticating. The user is authenticated from the remote system. The method and system also comprise allowing the user to access the peer from the remote system through a proxy server and using the token, if the user is authenticated.

For clarity, the present invention will be described in terms of single components of a network, such a single token, a single remote system, and a single peer. However, one of ordinary skill in the art will readily recognize that the method and system are consistent with multiple components of the network, such as multiple tokens, multiple remote systems accessing multiple peers, as well as multiple proxies and other portions of the system.

Figure 1:
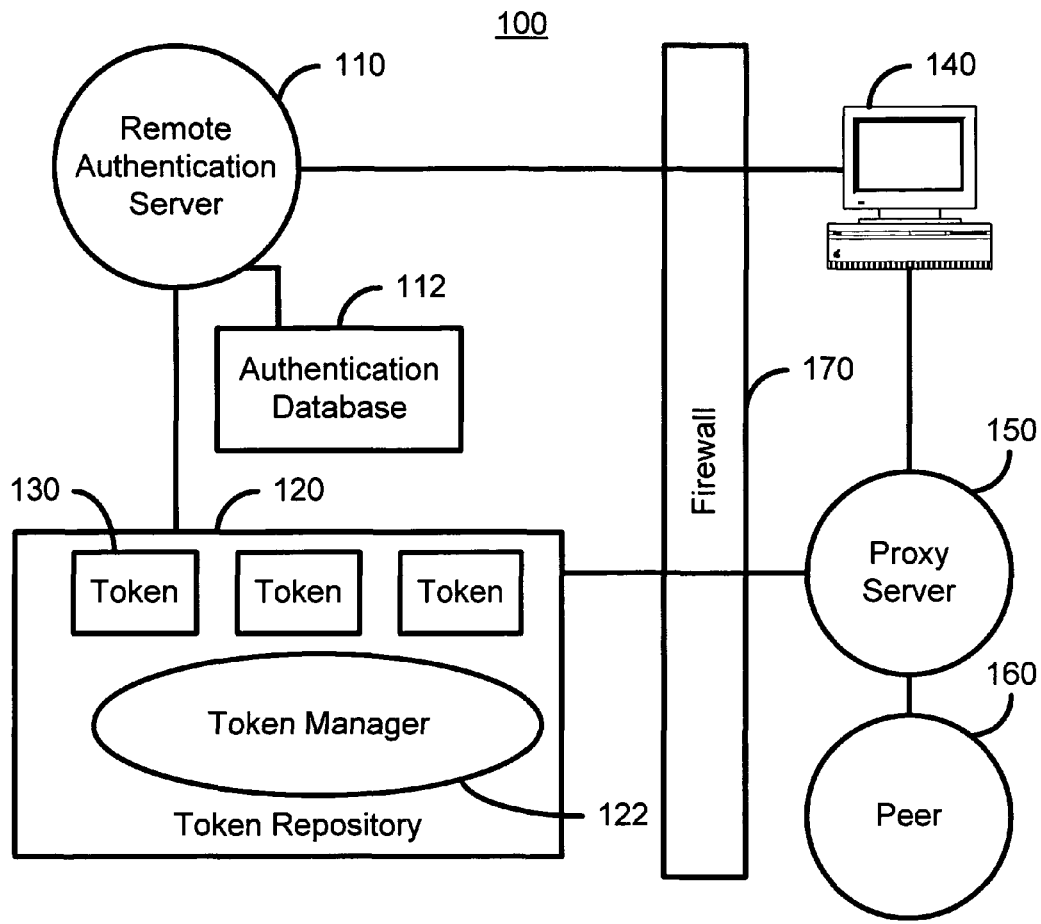
FIG. 1 is a diagram of a one embodiment of a network in accordance with the present invention that allows peers to be remotely and securely accessed.

FIG. 1 is a diagram of one embodiment of a network 100 in accordance with the present invention that allows peers to be remotely and securely accessed. In particular, the network 100 includes remote authentication server 110 and proxy server 150, which are used in providing remote and secure access to peers. Generally, the remote authentication server 110 uses an authentication database 112 for storing credentials such as usernames and passwords. However, in another embodiment, another mechanism for storing such credentials can be used. In a preferred embodiment, a token repository 120 having a token manager 122 is also used. Also depicted are remote system 140 and peer 160. In general, the network 100 includes a number of other peers, another number of proxies, and may include other remote systems which are not shown for clarity. Also depicted is a firewall 170, which protects at least the remote authentication server 110 and token repository 120. Note that the peer 160 and/or the remote system 140 may also be protected by firewall(s) (not shown). In a preferred embodiment, at least some of the components 110, 120 140, 150, and 160 communicate via the Internet (not explicitly shown). However, nothing prevents another mechanism for communication between the components 110, 120 140, 150, and 160 of the network 100.

Figure 2:
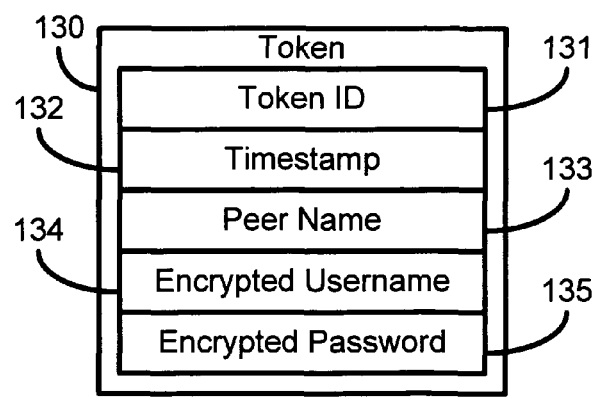
FIG. 2 is a more detailed diagram of one embodiment of a token in accordance with the present invention.

The token repository 120 is used to store tokens, such as the token 130. Note that although one token 130 is denoted and only three tokens are depicted for clarity, in general, a large number of tokens may exist at any given time in the network 100. FIG. 2 is a more detailed diagram of one embodiment of a token 130 in accordance with the present invention. Referring to FIGS. 1 and 2, the token 130 includes authentication information for the user and the peer 160. Thus, the token 130 includes a token identification 131, the peer name 133 of the peer 160, an encrypted username 134 and an encrypted password 135. The token identification 131 includes a unique identification for the token. The peer name indicates the peer 160 with which the token 130 is associated. The encrypted username 134 and encrypted password 135 are for the user that has been authenticated by the remote authentication server 110. In a preferred embodiment, the token 130 also includes a timestamp 132. The timestamp 132 preferable indicates the time at which token 130 was created. The token manager 122 is used to expire, or invalidate, any tokens that have not been consumed in a particular time. The token manager 122 preferable utilizes the timestamp 132 in performing this function. Consequently, tokens that are not consumed within the particular time may be removed by the token manager. In addition, the token manager 122 manages creation, storage, retrieval, and invalidation of tokens within the token repository 120. Note that although the token manager 122 is depicted as residing within the token repository 120, nothing prevents the token manger 122 from residing at another location.

The remote system 140 is utilized by a user of the network 100 to remotely access the peer 160. In general, the user is the owner of the peer 160 (peer owner) to which the user is trying to obtain remote access. Consequently, the terms peer owner and user are typically utilized interchangeably. In addition, the present invention is described in the context of a peer owner attempting to access the peer 160. However, one of ordinary skill in the art will readily recognize that the method and system apply with full force to an authorized user other than the peer owner. The peer 160 is preferably similar to a conventional peer. Consequently, the peer 160 preferably has a public portion (not explicitly shown) and a protected portion (not explicitly shown). The peer 160 is more fully discussed, particularly with respect to FIG. 3, below.

The combination of at least the remote authentication server 110 and the proxy server 150 are used by the peer owner to remotely and securely access the peer 160 from the remote system 140. In particular, the remote authentication sever 110 authenticates the peer owner and provides the token 130 based on the authentication. If properly authenticated, the user is an authorized user for the peer 160. Consequently, the authentication generally includes ensuring that the peer owner provides the username and password which the authentication database 112 has for the peer 160 and the peer owner. However, another mechanism for authenticating the user. The token 130 provided by the remote authentication server 110 is generally stored in the token repository 120. In addition, a reference to the token 130 is returned to the remote system 140 for use by the peer owner. In a preferred embodiment, the token 130 is returned to the remote system 140 by embedding the token 130 in a mechanism for allowing the remote system 140 to contact the proxy server 150. Preferably, this mechanism is a URL redirect.

The proxy server 150 employs the token 130 to allow the remote system 140, and thus the peer owner, to remotely and securely access the peer 160. The present application is related to U.S. patent application Ser. No. 10/813,839 entitled "Method and System for Providing Web Browsing Through a Firewall in a Peer to Peer Network" filed on Mar. 31, 2004, and assigned to the assignee of the present application. Applicant hereby incorporates by reference the above-identified co-pending application. In a preferred embodiment, the proxy server 150 also includes the proxy server described in the above-identified co-pending application. In particular, the architecture described in the above-identified co-pending application including the proxy server 150 enables the web browser running on another computer, either visiting computer (not shown) or another peer (not shown), to access the peer 150. As described in the above-identified co-pending application, access is accomplished using the proxy server 150 that is separate and apart from the peer 160 (and other peers) of the network 100, and allowing a user of a peer 160, which may be firewall-protected, with the enabled incoming web traffic by establishing an outbound connection from the peer 160 with the proxy server 150. Incoming Web traffic for the peer server 160 is then directed to the proxy server 150. In such an embodiment, the proxy server 150 multiplexes the Web traffic using a proprietary protocol to the peer 160, thus enabling generic web traffic to flow to the peer 160 despite the presence of a firewall (not shown). In the case where there are multiple firewall-protected peers (not explicitly depicted), the proxy server 150 acts as a switchboard to receive and dispatch the incoming requests to the appropriate peers. To accomplish this, the above-identified co-pending application describes a process which includes the peer 160 registering an outbound socket connection with the proxy server 150. All incoming requests intended for the peer 160 are redirected to the proxy server 150. In response to receiving a redirected request, the proxy server 150 finds the socket connection to the peer 160, translates the requests into a multiplexed protocol comprising a request packet, and sends the request packet to the peer 160. The peer node 160 receives the request packet, demultiplexes the request, converts the request packet back into the original request, and passes the request to a local Web server (not shown in FIG. 1). The peer 160 receives a response from Web server, converts the response into a response packet, and sends the response packet to the proxy server 150 over the outbound socket connection. The proxy server 150 receives the response packet from the peer 160, converts the response packet back into the response, and sends the response to the requesting web browser (not explicitly depicted). Thus, P2P sharing can take place through a firewall using an embodiment of the proxy server 150 as described in the above-identified co-pending application.

Figure 3:
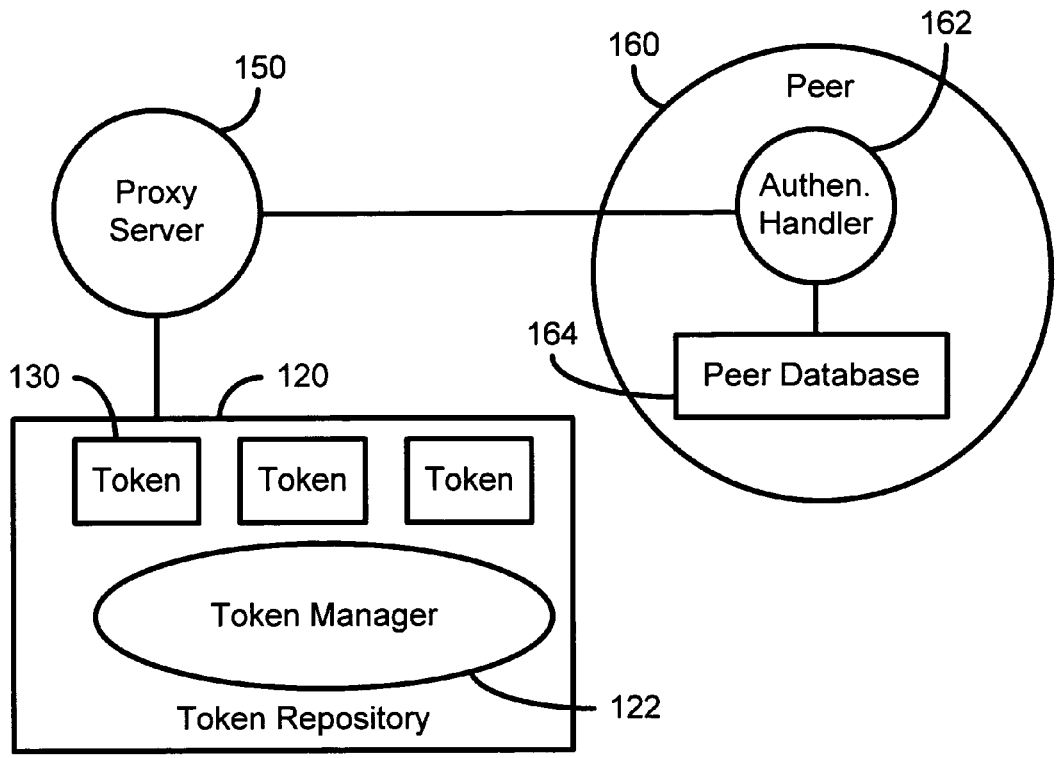
FIG. 3 is a more detailed diagram of a proxy server interacting with a peer in accordance with the present invention.

FIG. 3 is a more detailed diagram of one embodiment a proxy server 150 interacting with one embodiment of a peer 160 in accordance with the present invention. Referring to FIGS. 1-3, the peer 160 preferably includes an authentication handler 162 and a peer database 164. As its name suggests, the authentication handler 162 manages authentication of users to ensure that users are authorized. The peer database 164 stores information relating to authorized users, such as the peer owner. Thus, in a preferred embodiment, the peer database 164 preferably includes the username and password of each authorized user.

In accordance with the present invention, the proxy server 150 authenticates the remote system 140 and the peer owner using the token 130. Preferably this is accomplished through communication between the proxy server 150 and the token repository 120. In particular, the proxy server 150 receives at least an indication of the identity of the token 130 from the remote system 140, for example when the remote system 140 is redirected to the proxy server 150. The proxy server 150 is then used to access the peer 160. In one embodiment, the proxy server 150 authenticates the token 130, determining that the token 130 is still valid. The proxy server 150 may obtain the token 130 from the token repository 120 and pass the valid token to the peer 160. The peer 160 may use the token 130 to authenticate the user again. In another embodiment, the peer 160 may simply trust the authentication performed by the proxy server 150. Communication can then be allowed between the peer 160 and the remote system 140 through the peer 150, as described above. Thus, the peer owner has been properly authenticated and is allowed access to the peer 160, including protected portions of the peer 160 (not explicitly shown in FIGS. 1-3). Thus, the session established between the proxy server 150 and the peer 160, and thus between the peer 160 and the remote system 140, is continued.

Thus, using the network 100, the peer owner can remotely and securely access the peer 160. Furthermore, this is accomplished without the expense of obtaining secure certificates. Moreover, the complexity of conventional systems, such as KERBEROS based systems, is avoided.

Figure 4:
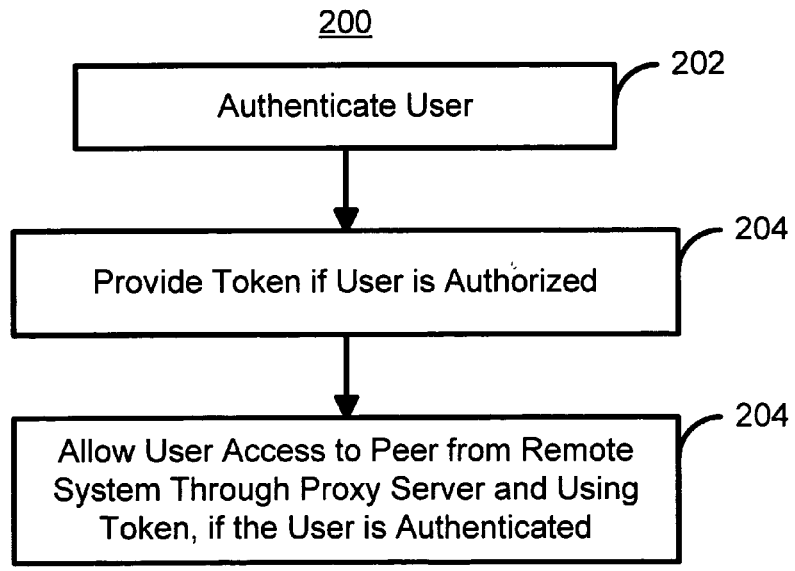
FIG. 4 is a high-level flow chart depicting one embodiment of a method in accordance with the present invention that allows peers to be remotely and securely accessed.

FIG. 4 is a high-level flow chart depicting one embodiment of a method 200 in accordance with the present invention that allows peers to be remotely and securely accessed. For clarity, the method 200 is described in the context of the network 100. However, the method 200 might be implemented using another system (not shown). The user desiring remote and secure access to the peer 160 is authenticated, via step 202. If the user is properly authenticated, then a token 130 is provided for the peer 160 based on the authentication, via step 204. The user is allowed to access the peer 160 from the remote system 140 through the proxy server 150 and using the token 130, if the user is authenticated, via step 208.

Thus, using the method 200 and network 100, the peer owner can remotely and securely access the peer 160. Furthermore, this is accomplished without the expense of obtaining secure certificates and without the complexity of conventional systems, such as KERBEROS based systems.

Figure 5:
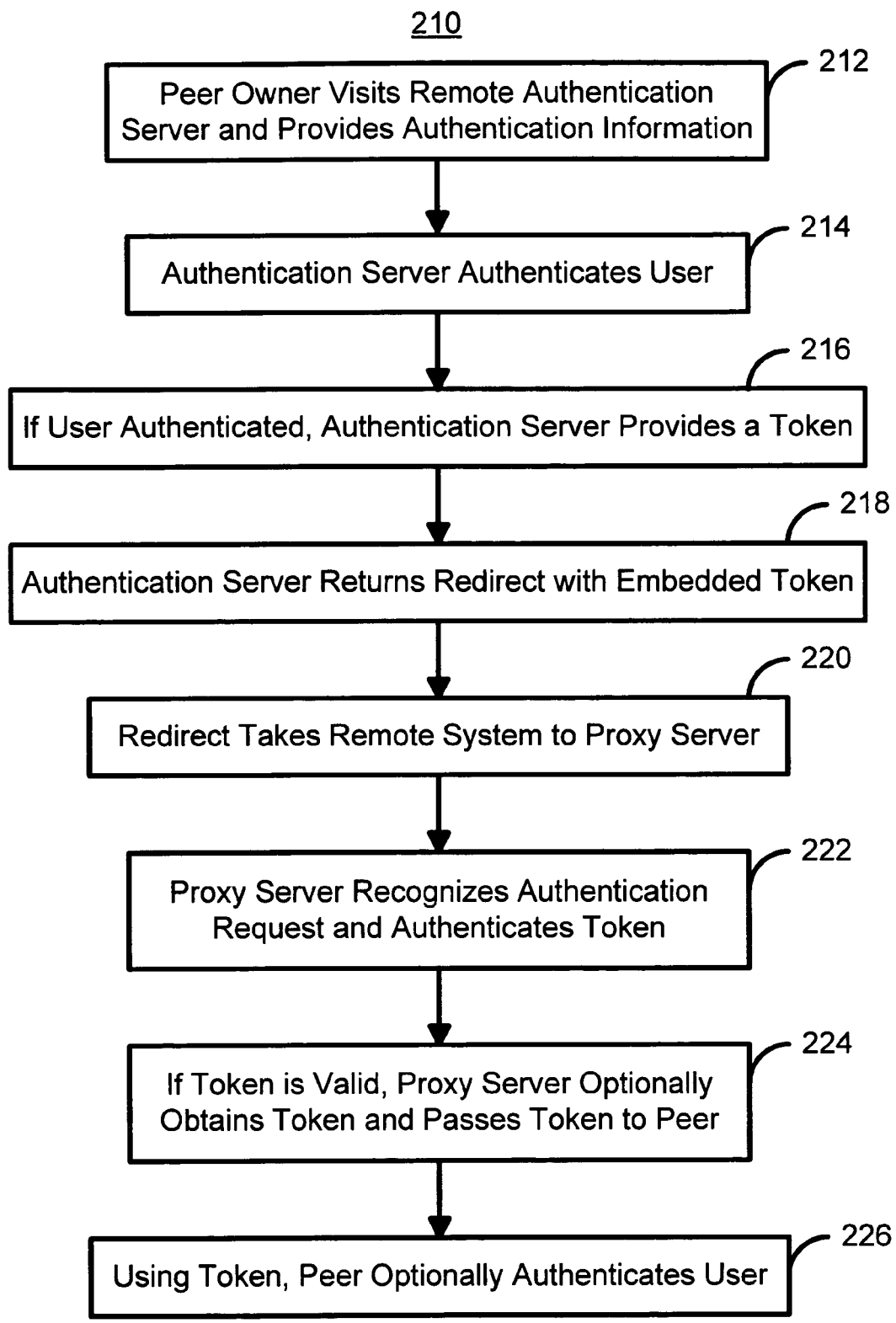
FIG. 5 is a more detailed flow chart depicting one embodiment of a method in accordance with the present invention that allows peers to be remotely and securely accessed.

FIG. 5 is a more detailed flow chart depicting one embodiment of a method 210 in accordance with the present invention that allows peers to be remotely and securely accessed. The method 210 is described in the context of the network 100, and portions thereof, depicted in FIGS. 1-3. However, nothing prevents the method 210 from being performed by another system (not shown).

Using the remote system 140, the peer owner visits the remote authentication server 110 and provides authentication information, via step 212. In a preferred embodiment, step 212 includes the peer owner providing the peer name of the peer 160, username, and password of the user to the remote authentication server 110 via a secure connection. Step 212 is performed using a browser (not shown) on the remote system 140. The remote authentication server 110 attempts to authenticate the peer owner using the information provided, via step 214. In a preferred embodiment, the remote authentication server 110 compares the information provided in step 212 to the information in the authentication database 112. If the user has been authenticated, then the remote authentication server 110 creates a unique token 130 and stores the token 130 in the token repository 120, via step 216. Note that the remaining steps, 218-224 are also performed only if the user has been authenticated. The remote authentication server 110 returns a reference to the token 130 embedded in a URL redirect to remote system 140, via step 218. The redirect refers the browser of the remote system 140 to the proxy server 150, via step 220. The proxy server 150 is for the peer 160. Based on the redirect, the proxy server 150 recognizes that an authentication request is being made and authenticates the token 130 to determine that the token 130 is valid, via step 222. Step 222 thus includes the proxy server 150 communicating with the token repository 120 to validate the token 130, for example ensuring that the token 130 has not expired.

If the token is determined to be valid in step 222, then the token is retrieved from the token repository 120 by the proxy server 150 and optionally passed to the peer 160, via step 224. Using the authentication handler 162, the peer 160 optionally obtains the username and password from the token 130, decrypts these items, and authenticates the user against the peer database 164, via step 226. Once the peer owner has been authenticated, the peer owner can remotely access the peer 160, including the protected portions of the peer 160. Thus, the peer owner may modify or perform other operations on the peer 160.

Thus, using the methods 200 and/or 210, and network 100, the peer owner can remotely and securely access the peer 160. Furthermore, this is accomplished without the expense of obtaining secure certificates and without the complexity of conventional systems, such as KERBEROS based systems. Consequently, flexibility and simplicity of the use of P2P systems is improved.

A method and system for remotely and securely accessing peers in a P2P network has been disclosed. The present invention has been described in accordance with the embodiments shown, and one of ordinary skill in the art will readily recognize that there could be variations to the embodiments, and any variations would be within the spirit and scope of the present invention. Software written according to the present invention is to be stored in some form of computer-readable medium, such as memory, CD-ROM or transmitted over a network, and executed by a processor. Consequently, a computer-readable medium is intended to include a computer readable signal which, for example, may be transmitted over a network. Accordingly, many modifications may be made by one of ordinary skill in the art without departing from the spirit and scope of the appended claims.

I claim:

1. A method for allowing a peer owner access to a peer from a remote system comprising:
   receiving an authentication request having authentication information from the peer owner;
   determining that the peer owner is authentic based on the authentication information;
   generating a token upon authentication of the peer owner, wherein the token is employed to allow the peer owner to remotely access the peer from the remote system;
   storing the token;
   providing a redirect message having a reference to the token, wherein the redirect message directs the peer owner to interact with a proxy server;
   interacting with the proxy server to validate the token; and
   providing the token to the proxy server upon validating the token thereby facilitating authentication of the peer owner for communications with the peer, wherein the proxy server passes the token to the peer and the peer performs a second authentication of the peer owner after receiving the token from the proxy server.

2. The method as recited in claim 1, wherein the token is stored at a token repository and the proxy server authenticates the token at the token repository.

3. The method as recited in claim 2, wherein a firewall is disposed between the token repository and the proxy server such that the proxy server communicates with the token repository through the firewall to authenticate and receive the token.

4. The method as recited in claim 1, wherein the proxy server passes the token to the peer to facilitate access of the peer by the peer owner from a remote location.

5. The method as recited in claim 1, wherein the token expires if the token has not been used within a particular time.

6. The method as recited in claim 5, wherein the token is no longer valid after the particular time.

7. A system for allowing a peer owner remote access to a peer from a remote system, the system comprising:
   an authentication server adapted to:
      receive an authentication request having authentication information from the peer owner at the remote system;
      determine that the peer owner is authentic based on the authentication information;
      generate a token upon authentication of the peer owner, wherein the token is employed to allow the peer owner to access the peer; and
      provide a redirect message to the peer owner, wherein the redirect message directs the peer owner to interact with a proxy server;
   a token repository adapted to:
      store the token, wherein the redirect message provided by the authentication server includes a reference to the token stored in the token repository;
      interact with the proxy server to validate the token; and
      provide the token to the proxy server upon validating the token thereby facilitating authentication of the peer owner for communications with the peer, wherein the proxy server passes the token to the peer and the peer performs a second authentication of the peer owner after receiving the token from the proxy server.

8. The system as recited in claim 7, wherein the proxy server authenticates the token at the token repository.

9. The system as recited in claim 7, wherein a firewall is disposed between the token repository and the proxy server such that the proxy server communicates with the token repository through the firewall to authenticate and receive the token.

10. The system as recited in claim 7, wherein the proxy server passes the token to the peer to facilitate access of the peer by the peer owner from a remote location.

11. The system as recited in claim 7, wherein the peer authenticates the peer owner after receiving the token from the proxy server.

12. The system as recited in claim 7, further comprising a token manager, wherein the token manager invalidates the token if the token has not been used within a particular time.

13. The system as recited in claim 12, wherein the token manager resides in the token repository.

14. The method as recited in claim 7, wherein the peer owner owns the peer.

15. The system as recited in claim 7, wherein the token repository is accessible through the authentication server.

* * * * *